US012634046B2

(12) United States Patent
Jun et al.

(10) Patent No.: US 12,634,046 B2
(45) Date of Patent: May 19, 2026

(54) WIRELESS COMMUNICATION TERMINAL PERFORMING HARQ PROCESS FOR PLURALITY OF SIMs AND OPERATING METHOD OF THE WIRELESS COMMUNICATION TERMINAL

(71) Applicant: SAMSUNG ELECTRONICS CO., LTD., Suwon-si (KR)

(72) Inventors: Kyungjae Jun, Suwon-si (KR); Youngtaek Kim, Suwon-si (KR); Youngju Yoon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1095 days.

(21) Appl. No.: 17/699,691

(22) Filed: Mar. 21, 2022

(65) Prior Publication Data

US 2022/0360372 A1      Nov. 10, 2022

(30) Foreign Application Priority Data

May 6, 2021      (KR) ........................ 10-2021-0058821

(51) Int. Cl.
    *H04L 1/1822*        (2023.01)
    *H04L 1/1812*        (2023.01)
           (Continued)

(52) U.S. Cl.
    CPC .......... *H04L 1/1822* (2013.01); *H04L 1/1812* (2013.01); *H04L 1/1854* (2013.01); *H04L 1/1861* (2013.01); *H04W 8/18* (2013.01)

(58) Field of Classification Search
    CPC ... H04L 1/1822; H04L 1/1812; H04L 1/1854; H04L 1/1861; H04W 8/18
    See application file for complete search history.

(56) References Cited

U.S. PATENT DOCUMENTS 7,181,666 B2    2/2007  Grob et al.
9,843,424 B2  12/2017  Choi et al.
(Continued)

FOREIGN PATENT DOCUMENTS

KR    10-2017-0139554 A    12/2017

OTHER PUBLICATIONS

3rd Generation Partnership Project; Technical Specification Group Radio Access Network; Evolved Universal Terrestrial Radio Access (E-UTRA); Medium Access Control (MAC) Protocol Specification (Mar. 2016).

*Primary Examiner* — Michael Thier
*Assistant Examiner* — Nevena Zecevic Sandhu
(74) *Attorney, Agent, or Firm* — Muir Patent Law, PLLC

(57) ABSTRACT

A method of operating a wireless communication terminal, which performs a hybrid automatic repeat request process for a plurality of subscriber identity modules (SIMs), includes: setting up communication with a plurality of base stations that respectively correspond to the plurality of SIMS; allocating a radio frequency resource to receive data from each base station corresponding to each SIM in an SIM allocation duration, wherein the SIM allocation duration is set corresponding to each of the plurality of SIMS in a multi-SIM allocation period, and wherein the multi-SIM allocation period corresponds to a data round trip time (RTT) of a base station of the plurality of base stations; and transmitting, with respect to the received data, one of an acknowledged (ACK) signal and a negative-ACK (NACK) signal to each base station corresponding to each SIM.

20 Claims, 13 Drawing Sheets

(51) Int. Cl.
    *H04L 1/1829*         (2023.01)
    *H04W 8/18*           (2009.01)

(56)              References Cited

U.S. PATENT DOCUMENTS

| | | | |
|---|---|---|---|
| 9,854,601 B2 | 12/2017 | Rajaee et al. | |
| 10,523,375 B2 * | 12/2019 | Dev | H04L 1/1822 |
| 10,880,725 B2 | 12/2020 | Park et al. | |
| 2007/0110063 A1 * | 5/2007 | Tang | H04L 45/02 |
| | | | 370/432 |
| 2013/0150013 A1 | 6/2013 | Liu et al. | |
| 2016/0050049 A1 | 2/2016 | Yang et al. | |
| 2016/0119860 A1 * | 4/2016 | Chawla | H04W 48/16 |
| | | | 455/434 |
| 2017/0295570 A1 * | 10/2017 | Awad | H04W 72/0446 |
| 2019/0141754 A1 * | 5/2019 | Bai | H04L 27/2646 |
| 2019/0281469 A1 * | 9/2019 | Wang | H04W 72/27 |
| 2020/0084819 A1 * | 3/2020 | Abedini | H04W 76/15 |
| 2020/0137556 A1 * | 4/2020 | Park | H04L 1/0045 |
| 2020/0187184 A1 | 6/2020 | Otwani et al. | |
| 2020/0396714 A1 | 12/2020 | Lee | |
| 2021/0105607 A1 * | 4/2021 | Ioffe | H04W 68/005 |
| 2021/0251037 A1 * | 8/2021 | Akkarakaran | H04W 76/28 |
| 2021/0345239 A1 * | 11/2021 | Houghton | H04W 28/0278 |
| 2023/0078636 A1 * | 3/2023 | Wang | H04W 72/02 |
| | | | 370/329 |
| 2023/0199766 A1 * | 6/2023 | Li | H04W 72/23 |
| | | | 370/329 |
| 2023/0371023 A1 * | 11/2023 | Nakata | H04W 72/115 |

* cited by examiner

Figures 9, 10:
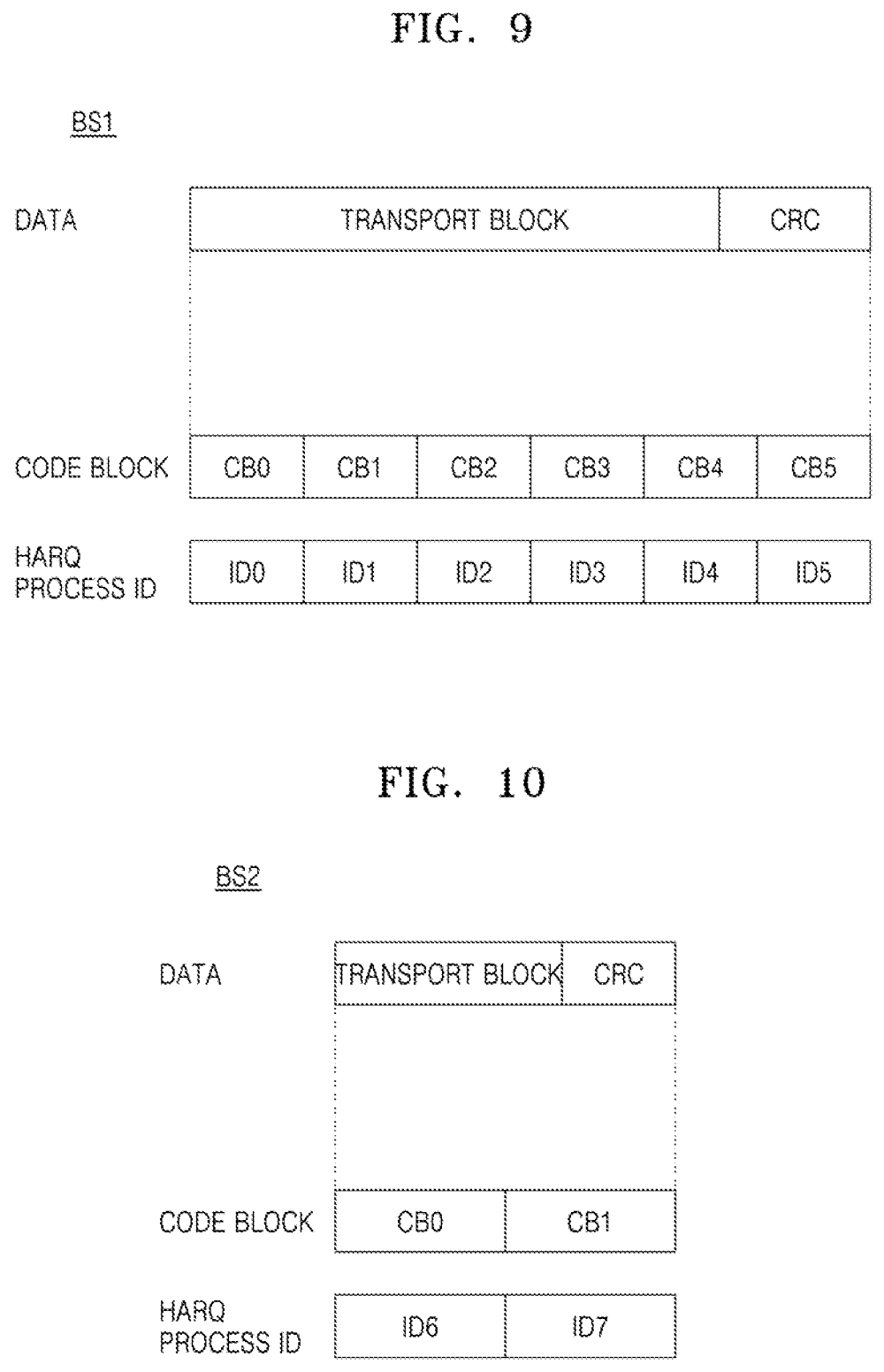

| DATA | TRANSPORT BLOCK | CRC |
|------|-----------------|-----|

| CODE BLOCK | CB0 | CB1 | CB2 | CB3 | CB4 | CB5 |
|------------|-----|-----|-----|-----|-----|-----|

| HARQ PROCESS ID | ID0 | ID1 | ID2 | ID3 | ID4 | ID5 |
|-----------------|-----|-----|-----|-----|-----|-----|

| DATA | TRANSPORT BLOCK | CRC |
|------|-----------------|-----|

| CODE BLOCK | CB0 | CB1 |
|------------|-----|-----|

| HARQ PROCESS ID | ID6 | ID7 |
|-----------------|-----|-----|

From S10

DETERMINE WIRELESS NETWORK IN
WHICH COMMUNICATION IS SET UP ——S210

SET PRIORITIES OF WIRELESS NETWORKS ——S220

SET RATE OF SIM ALLOCATION DURATION ——S230

To S30

WIRELESS COMMUNICATION TERMINAL PERFORMING HARQ PROCESS FOR PLURALITY OF SIMs AND OPERATING METHOD OF THE WIRELESS COMMUNICATION TERMINAL

CROSS-REFERENCE TO RELATED APPLICATION

This application is based on and claims priority under 35 U.S.C. § 119 to Korean Patent Application No. 10-2021-0058821, filed on May 6, 2021, in the Korean Intellectual Property Office, the disclosure of which is incorporated by reference herein in its entirety.

BACKGROUND

1. Field

Embodiments relate to a wireless communication terminal, and more particularly, to an operating method of a wireless communication terminal that performs a hybrid automatic repeat request (HARQ) process for a plurality of subscriber identity modules (SIMs).

2. Description of the Related Art

To secure the reliability of communication through error detection or error compensation, a wireless communication terminal may perform a forward error correction (FEC) process or an automatic repeat request (ARQ) process.

SUMMARY

Embodiments are directed to a method of operating a wireless communication terminal that performs a hybrid automatic repeat request process for a plurality of subscriber identity modules (SIMs), the method including: setting up communication with a plurality of base stations that respectively correspond to the plurality of SIMs; allocating a radio frequency resource to receive data from each base station corresponding to each SIM in an SIM allocation duration, wherein the SIM allocation duration is set corresponding to each of the plurality of SIMs in a multi-SIM allocation period, and wherein the multi-SIM allocation period corresponds to a data round trip time (RTT) of a base station of the plurality of base stations; and transmitting, with respect to the received data, one of an acknowledged (ACK) signal and a negative-ACK (NACK) signal to each base station corresponding to each SIM..

Embodiments are directed to a wireless communication terminal that performs a hybrid automatic repeat request (HARQ) process for a plurality of subscriber identity modules (SIMs), the wireless communication terminal including: a HARQ processor configured to set a SIM allocation duration for each of the plurality of SIMs in a multi-SIM allocation period, wherein the multi-SIM allocation period corresponds to a data round trip time of a base station among a plurality of base stations, and configured to allocate a radio frequency resource to communicate with a base station corresponding to each SIM; a reception module configured to receive data from a base station for which communication is set up corresponding to each SIM in the SIM allocation duration; and a transmission module configured to transmit one of an acknowledged signal and a negative-acknowledged signal with respect to the received data.

Embodiments are directed to a method of operating a wireless communication terminal that performs a hybrid automatic repeat request process for a plurality of subscriber identity modules (SIMs), the method including: setting up communication with a first base station corresponding to a first SIM of the plurality of SIMs; setting up communication with a second base station corresponding to a second SIM of the plurality of SIMs; receiving data from the first base station in a first SIM allocation duration, which is allocated corresponding to the first base station, in a multi-SIM allocation period that corresponds to a data round trip time of one of the first base station and the second base station; transmitting, to the first base station, one of an acknowledged signal and a negative-acknowledged signal with respect to the received data from the first base station; receiving data from the second base station allocated in a second SIM allocation duration, which is different from the first SIM allocation duration and is allocated corresponding to the second base station, in the multi-SIM allocation period; and transmitting, to the second base station, one of the acknowledged signal and the negative-acknowledged signal with respect to the received data from the second base station.

BRIEF DESCRIPTION OF THE DRAWINGS

Features will become apparent to those of skill in the art by describing in detail example embodiments with reference to the attached drawings in which:

FIG. 4 is a block diagram of a hybrid automatic repeat request (HARQ) process of a UE, according to an example embodiment;

FIG. 9 illustrates data generated in a first BS according to the example embodiment of FIG. 8;

FIG. 10 illustrates data generated in a second BS according to the example embodiment of FIG. 8;

DETAILED DESCRIPTION

Figure 1:
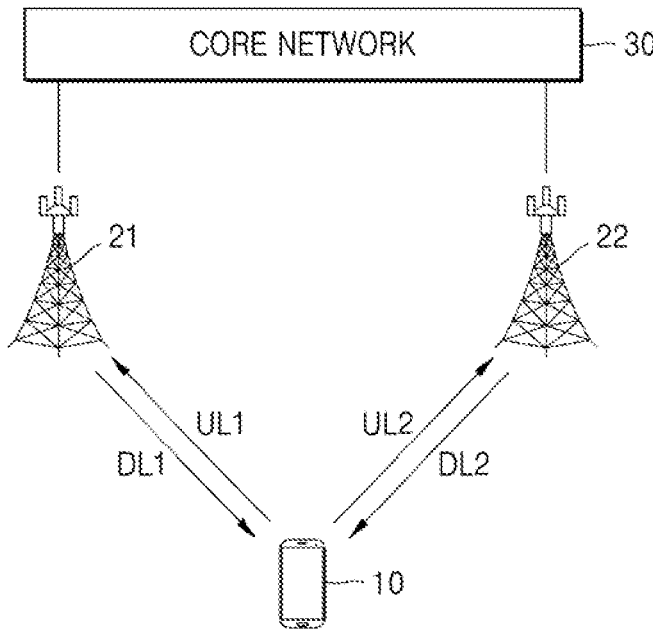
FIG. 1 illustrates an example where communication is performed with a plurality of base stations (BSs) based on a plurality of subscriber identity modules (SIMs), according to an example embodiment.

FIG. 1 illustrates an example where communication is performed with a plurality of base stations (BSs) based on a plurality of subscriber identity modules (SIMs), according to an example embodiment.

Referring to FIG. 1, a wireless communication system may include a plurality of radio access networks (RANs) and a core network 30.

The RAN may include, e.g., an evolved universal mobile telecommunications system (UMTS) terrestrial radio access network (E-UTRAN) based on radio access technology (RAT) of long term evolution (LTE) or LTE-Advanced (LTE-A), and the core network 30 may include an evolved packet core (EPC), thus implementing an evolved packet system (EPS). The RAN may include, e.g., a next-generation (NG)-RAN based on $5^{th}$-generation (5G) new radio (NR) RAT, and the core network 30 may include, e.g., a 5G core (5GC), thus implementing a 5G system (5GS).

A first base station (BS) 21 or a second BS 22 may generally refer to a fixed station that communicates with a user equipment (UE) 10 and/or another BS, and exchange data and control information with the UE 10 and/or the other BS by communicating with the UE 10 and/or the other BS. For example, the BS 21 or 22 may be referred to as a Node B, an evolved Node B (eNB), a next-generation Node B (gNB), a sector, a site, a base transceiver system (BTS), an access point (AP), a relay node, a remote radio head (RRH), a radio unit (RU), a small cell, etc. The BS 21 or 22 may be referred to as an ng-eNB that is an eNB capable of operating with a 5GC, and may be referred to as an en-gNB that is a gNB capable of operating with an EPC and an eNB. Herein, the BS 12 or 22 or a cell may be interpreted as a generic meaning of some area or function covered by a base station controller (BSC) in code division multiple access (CDMA), a Node-B in wideband code division multiple access (WCDMA), an eNB in LTE, a gNB or a sector (site) in 5G, etc., and may include various coverage areas such as mega-cells, macrocells, microcells, picocells, femtocells, relay nodes, RRHs, RUs, small cell communication ranges, etc.

The UE 10 may be fixed or mobile, and may refer to devices capable of transmitting and receiving data and/or control information to and/or from the BS 21 or 22 by communicating with the BS 21 or 22. For example, the UE 10 may be referred to as a terminal, a terminal equipment, a mobile station (MS), a mobile terminal (MT), a user terminal (UT), a subscriber station (SS), a wireless device, a handheld device, etc. The UE 10 may also refer to a vehicle of vehicle-to-everything (V2X).

The RAN between the UE 10 and the BS 21 or 22 may support communication among multiple users by sharing available radio frequency (RF) resources. For example, the RAN may adopt multiple access technology such as CDMA, frequency division multiple access (FDMA), time division multiple access (TDMA), orthogonal frequency division multiple access (OFDMA), single carrier-frequency division multiple access (SC-FDMA), OFDM-FDMA, OFDM-TDMA, OFDM-CDMA, etc.

Referring to FIG. 1, the UE 10 and the BS 21 or 22 may mutually communicate with each other through an uplink (UL) and a downlink (DL). In a wireless system such as an LTE system or an LTE-A system, an uplink UL1 or UL2 and a downlink DL1 or DL2 may transmit control information through a control channel such as a physical downlink control channel (PDCCH), a physical control format indicator channel (PCFICH), a physical hybrid ARQ indicator channel (PHICH), a physical uplink control channel (PUCCH), an enhanced physical downlink control channel (EPDCCH), etc., and transmit data through a data channel such as a physical downlink shared channel (PDSCH), a physical uplink shared channel (PUSCH), etc. The control information may also be transmitted using an enhanced PDCCH or extended PDCCH (EPDCCH).

The UE 10 may perform a hybrid automatic repeat request process (HARQ process) on data received from the plurality of first BS 21 and second BS 22. For example, the UE 10 may receive data, and receive data from another BS and perform the HARQ process until providing an acknowledged (ACK) signal or a negative-acknowledged (NACK) signal to any one BS by performing the HARQ process.

Figure 2:
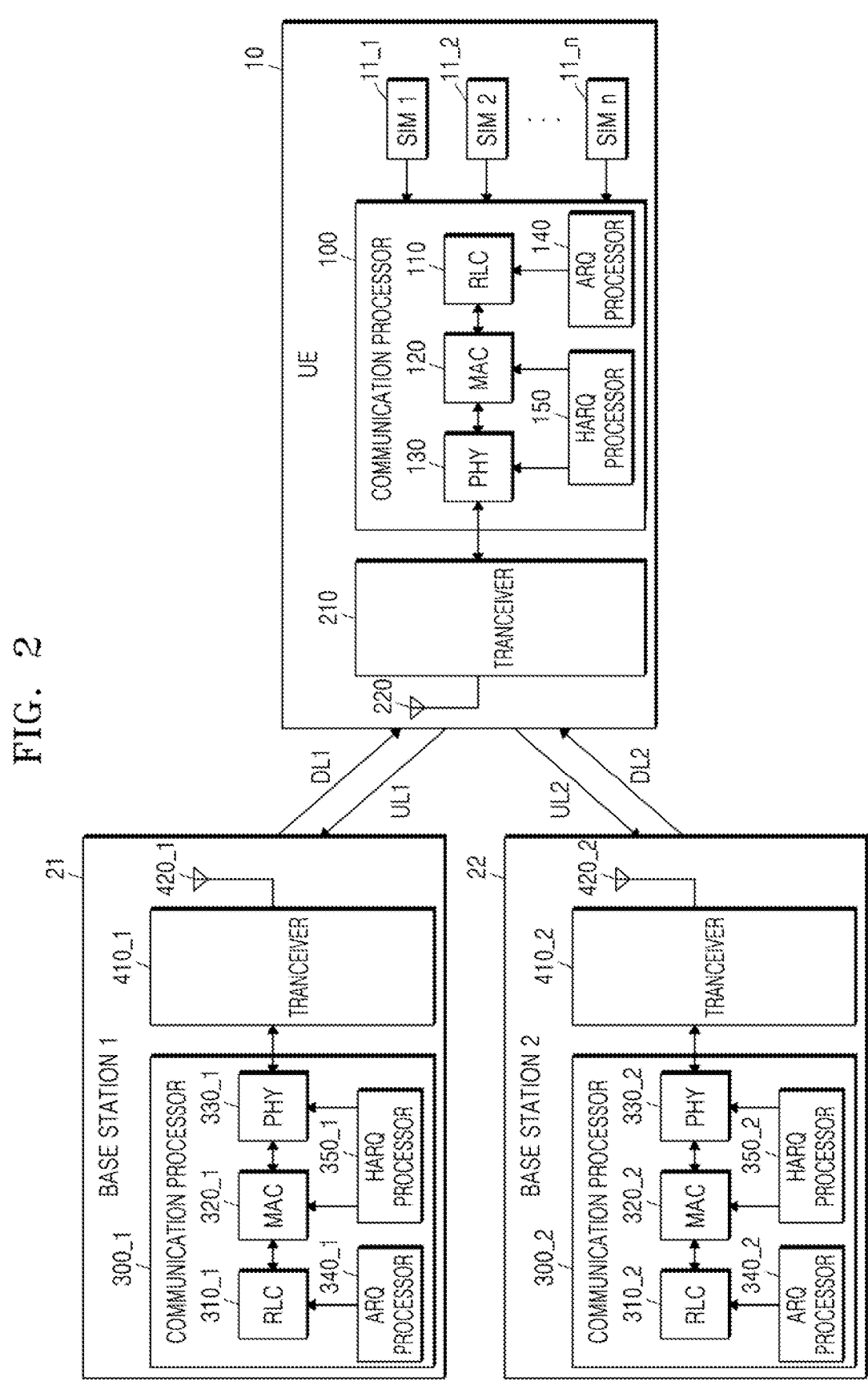
FIG. 2 is a block diagram of a wireless communication system, according to an example embodiment.

FIG. 2 is a block diagram of a wireless communication system, according to an example embodiment.

Referring to FIG. 2, the UE 10 may include a communication processor 100, a transceiver 210, and an antenna 220.

The communication processor 100 may perform communication with a BS corresponding to each of a plurality of first through $n^{th}$ SIMs 11_1 through 11_n.

The transceiver 210 may receive a signal through the downlink DL1 or DL2 and the antenna 220, and transmit a signal through the antenna 220 and the uplink UL1 or UL2.

When the communication processor 100 is requested to perform communication from the first SIM 11_1, the communication processor 100 may set up communication with the first BS 21 through the transceiver 210, and transmit and receive a signal through the downlink DL1 and the uplink UL1.

The transceiver 210 may include a filter, a mixer, a power amplifier (PA), and a low noise amplifier (LNA). The transceiver 210 may transmit and receive a signal through the antenna 220 and the uplink UL1 or UL2. The transceiver 210 may shift the signal provided from the communication processor 100 from a baseband to a radio frequency (RF) band (e.g., through a mixer), amplify the shifted signal (e.g., through a power amplifier), and provide the amplified signal to the antenna 220. The transceiver 210 may process a signal received through the downlink DL1 or DL2 and the antenna 220, and provide the processed signal to the communication processor 100. The transceiver 210 may amplify the signal received through the antenna 220 (e.g., an LNA), shift the amplified signal from the RF band to the baseband (e.g., through the mixer), and provide the shifted signal to the communication processor 100.

The transceiver 210 may be connected corresponding to any one of the first through $n^{th}$ SIMs 11_1 through 11_n, and the transceiver 210 may be connected to each of the plurality of SIMs 11_1 through 11_n to transmit and receive data to and from the plurality of BSs 21 and 22 in a SIM allocation duration corresponding to each of the plurality of SIMs 11_1 through 11_n.

The communication processor 100 may include a radio link control (RLC) block 110, a medium access control (MAC) block 120, a physical layer (PHY) block 130, an ARQ processor 140, and a HARQ processor 150. Although illustrated as being separated in FIG. 2, two or more of the RLC block 110, the MAC block 120, or the PHY block 130 may be implemented as one block unit.

The RLC block 110, the MAC block 120, and a PHY block 130 may respectively perform operations corresponding to an RLC layer, a MAC layer, and a PHY layer (or a physical layer) of a wireless communication system.

The RLC block 110 may perform, e.g., ARQ retransmission.

The MAC block 120 may perform logic-channel multiplexing, HARQ retransmission, scheduling of the uplink UL1 or UL2 and the downlink DL1 or DL2, carrier aggregation (CA) control, etc.

The PHY block 130 may receive a transport block from the MAC block 120 for the uplink UL1 or UL2, and perform cyclic redundancy correction (CRC) insertion, encoding, rate matching, scrambling, modulation, antenna mapping, etc.

The HARQ processor 150 may perform the HARQ process by controlling the MAC block 120 and the PHY block 130. For example, the HARQ processor 150 may repeatedly transmit, to the BS 21 or 22, the ACK/NACK signal with respect to packets received from the BS 21 or 22, by using a data channel.

Although not illustrated in FIG. 2, the communication processor 100 may further include a packet data convergence protocol (PDCP) block that may perform an operation such as Internet protocol (IP) header compression/decompression, ciphering/deciphering, etc.

Similar to the UE 10, a communication processor 300_1 or 300_2 of the BS 21 or 22 may include an RLC block 310_1 or 310_2, a MAC block 320_1 or 320_2, a PHY block 330_1 or 330_2, an ARQ processor 340_1 or 340_2, and a HARQ processor 350_1 or 350_2.

The RLC block 310_1 or 310_2, the MAC block 320_1 or 320_2, and the PHY block 330_1 or 330_2 may perform operations corresponding to the RLC layer, the MAC layer, and the PHY layer of the wireless communication system.

The ARQ processor 340_1 or 340_2 may perform an ARQ process by controlling the RLC block 310_1 or 310_2.

When the UE 10 performs wireless communication with the BSs 21 and 22 corresponding to the plurality of SIMs 11_1 through 11_n, the UE 10 may perform wireless communication corresponding to each of the plurality of SIMs 11_1 through 11_n in a different time duration through periodic RF switching. In this case, the UE 10 may perform RF switching based on the number of networks performing wireless communication in one multi-SIM allocation period, and perform RF switching repeatedly in each multi-SIM allocation period. The RF switching may refer to an operation of switching connection between each of the plurality of SIMs 11_1 through 11_n and the transceiver 210.

Figure 3:
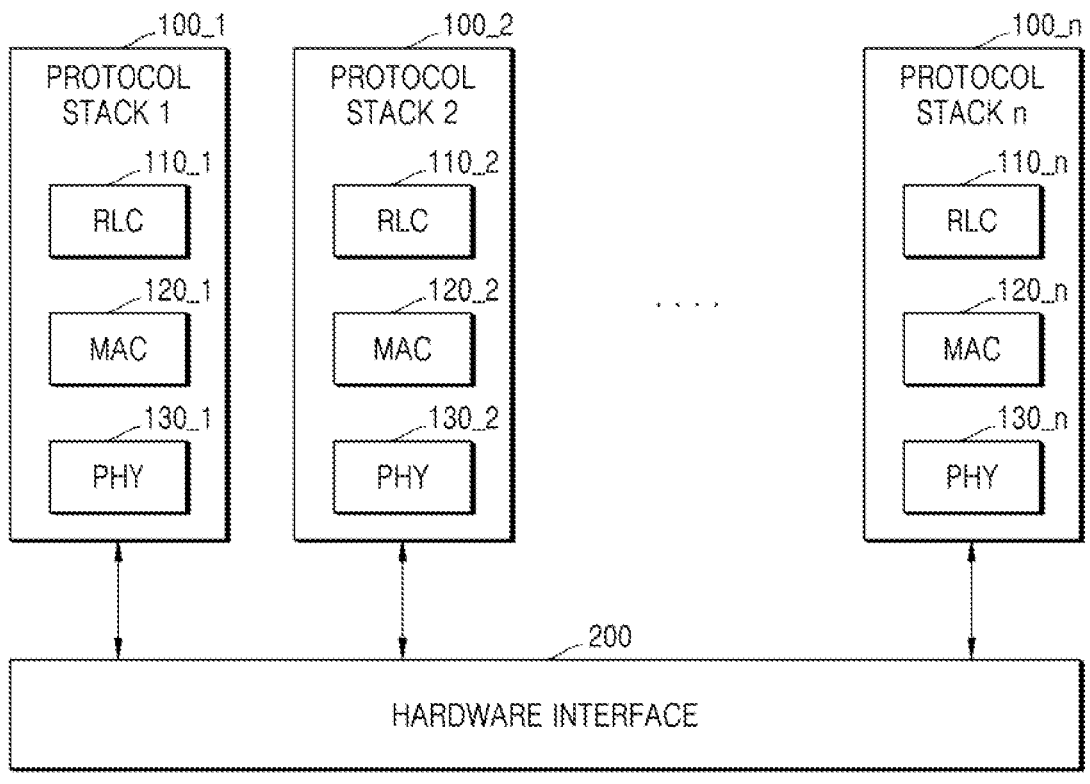
FIG. 3 is a block diagram of a stack of a user equipment (UE), according to an example embodiment.

FIG. 3 is a block diagram of a protocol stack system of a UE, according to an example embodiment. More specifically, FIG. 3 illustrates a control plane of a protocol stack system including a first protocol stack 100_1 and a second protocol stack 100_2.

One or more blocks shown in FIG. 3 may be implemented as hardware logic, or may be implemented as a software module executed by at least one processor. The protocol stack system of FIG. 3 may be implemented by, e.g., the communication processor 100 of FIG. 2. When communication is performed based on a plurality of SIMs, the communication processor 100 may perform operations for wireless communication through a plurality of protocol stack systems corresponding to FIG. 3.

Referring to FIG. 3, the protocol stack system may include the first protocol stack 100_1 through an n^{th} protocol stack 100_n respectively associated with the first SIM 11_1 through the n^{th} SIM 11_n.

Each of the first protocol stack 100_1 through the n^{th} protocol stack 100_n may support a random one of RATs distinguished from one another. The first protocol stack 100_1 and the second protocol stack 100_2 may interact with a shared upper layer, e.g., an application layer, and the upper layer may provide an interface regarding programs that obtain information about first wireless communication and second wireless communication or provide commands. The upper layer may be implemented in the communication processor 100 or in another device separated from the communication processor 100.

The protocol stack system may include a hardware interface 200 shared by the first protocol stack 100_1 and the second protocol stack 100_2. The hardware interface 200 may provide an interface for hardware, e.g., the transceiver 210 of FIG. 2. The first protocol stack 100_1 and the second protocol stack 100_2 may provide a signal to the transceiver 210 through the hardware interface 200 or obtain a signal from the transceiver 210. The hardware interface 200 may be referred to as a driver of the transceiver 210.

Each of the first to n^{th} protocol stacks 100_1 to 100_n for a control plane may include a plurality of layers. For example, referring to FIG. 3, the first protocol stack 100_1 may include an RLC layer 110_1, a MAC layer 120_1, and a PHY layer 130_1, which may correspond to three lower layers of an open system interconnection (OSI) model.

When the first protocol stack 100_1 performs an operation, this may indicate that the first SIM 11_1 performs the operation. When the second protocol stack 100_2 performs an operation, this may indicate that the second SIM 11_2 performs the operation.

When the UE 10 performs a HARQ process on data received from the plurality of BSs 21 and 22, each of the first to n^{th} protocol stacks 100_1 to 100_n corresponding to each SIM may perform the HARQ process. In this case, the UE 10 may receive data, and perform the HARQ process in another protocol stack until the ACK signal or the NACK signal is provided to any one BS by performing the HARQ process in any one protocol stack.

Figure 4:
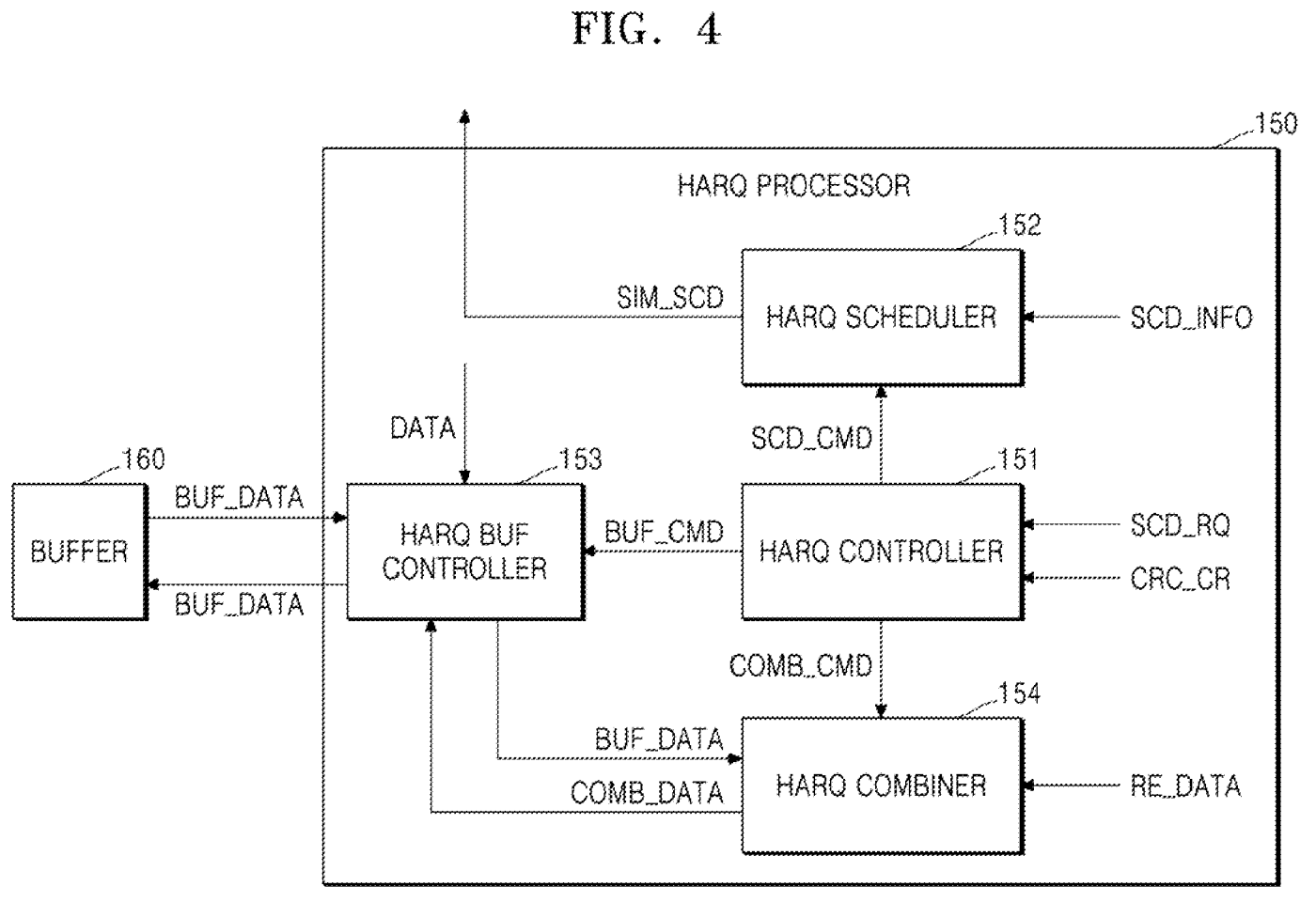

FIG. 4 is a block diagram of a HARQ process of a UE, according to an example embodiment.

Referring to FIG. 4, a HARQ processor 150 may include a HARQ controller 151, a HARQ scheduler 152, a HARQ buffer controller 153, and a HARQ combiner 154.

Various components of the HARQ processor 150 illustrated in FIG. 4 may be implemented as hardware, may be implemented as software executed by a central processing unit (CPU) in a modem or the HARQ processor 150, or may be implemented as a combination of hardware and software. Although it is illustrated in FIG. 4 that various information is transmitted between components in the HARQ processor 150, at least some of the various information may be generated in a software execution process of the CPU and may be provided to each component.

The HARQ controller 151 may control overall operations of the components included in the HARQ processor 150. The HARQ controller 151 may control an operation of storing received data in a buffer 160 or loading data from the buffer 160. The HARQ controller 151 may receive a cyclic redundancy check (CRC) result CRC_CR, and control an operation of storing HARQ data based on the CRC result CRC_CR. For example, when the HARQ controller 151 determines that the received data has an error as the CRC result CRC_CR, the HARQ controller 151 may transmit a buffer command BUF_CDM to the HARQ buffer controller 153 to instruct to store received data DATA as buffer data BUF_DATA. Moreover, the HARQ controller 151 may receive a scheduling request signal SCD_RQ and transmit a scheduling command SCD_CMD to the HARQ scheduler 152 based on the scheduling request signal SCD_RQ to control the HARQ scheduler 152.

When the HARQ scheduler 152 receives the scheduling command SCD_CMD from the HARQ controller 151, the HARQ scheduler 152 may set a SIM allocation duration corresponding to each of a plurality of BSs based on scheduling information SCD_INFO. The scheduling information SCD_INFO may be information about a rate of a SIM allocation duration corresponding to each BS. For example, the HARQ scheduler 152 may determine the rate of the SIM allocation duration based on a rate of data to be received from each BS. The HARQ scheduler 152 may output a SIM scheduling signal SIM_SCD to perform wireless communication based on a SIM corresponding to each SIM allocation duration based on the scheduling information SCD_INFO. For example, as the HARQ scheduler 152 may provide the SIM scheduling signal SIM_SCD to a PHY layer, and the UE 10 may perform wireless communication with a BS corresponding to each SIM allocation duration.

The HARQ buffer controller 153 may control transmission of data between the buffer 160 and the HARQ processor 150. The buffer 160 may be used to temporarily store the received data DATA until HARQ combination is completed. Combined data COMB_DATA may be directly provided to an external memory of the HARQ processor 150, or may be temporarily stored in the buffer 160 and then moved to the external memory.

The HARQ combiner 154 may combine retransmission data RE_DATA with the buffer data BUF_DATA stored in the buffer 160, and output the combined data COMB_DATA. The HARQ combiner 154 may receive the buffer data BUF_DATA through the HARQ buffer controller 153 and provide, to the HARQ buffer controller 153, the combined data COMB_DATA resulting from combining the retransmission data RE_DATA with the buffer data BUF_DATA.

Figure 5:
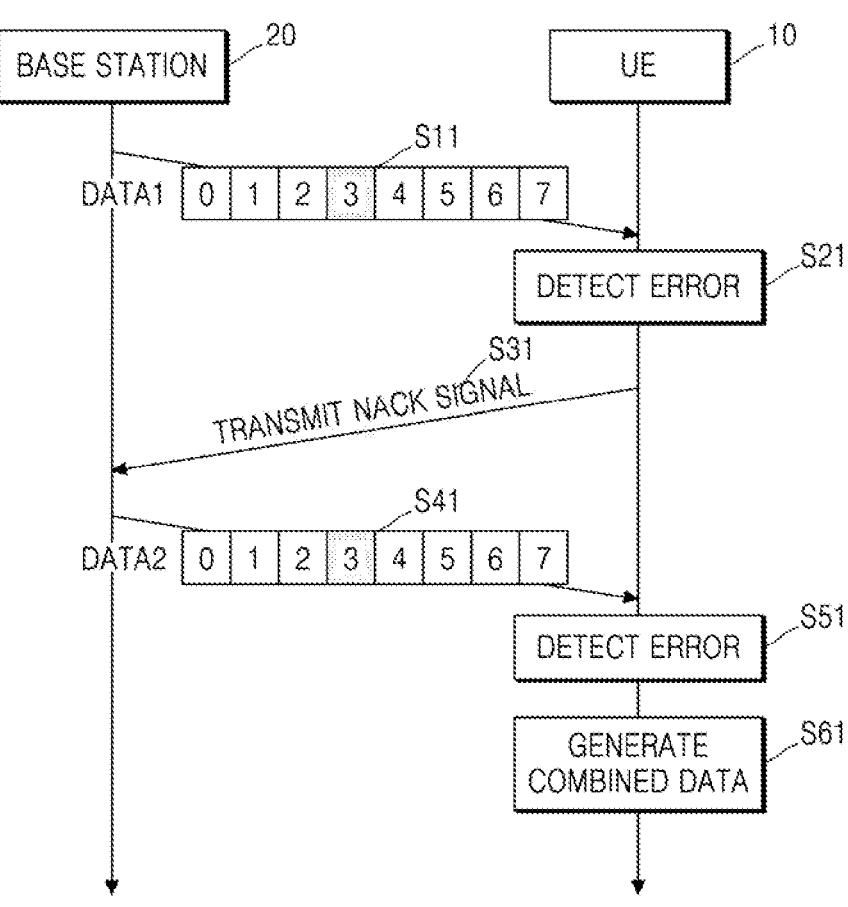
FIG. 5 is a flowchart of a method of performing a HARQ process, according to an example embodiment.

FIG. 5 is a flowchart of a method of performing a HARQ process, according to an example embodiment.

Referring to FIG. 5, in operation S11, a BS 20 may transmit a third code block of first data DATA1 (which includes a plurality of code blocks) to the UE 10. The first data DATA1 may include, e.g., a $0^{th}$ code block through a $7^{th}$ code block, and the BS 20 may sequentially transmit code blocks included in the first data DATA1 to the UE 10 in the unit of a sub-frame.

FIG. 5 shows an example in which the third code block among the plurality of code blocks is transmitted, but the UE 10 may receive the first data DATA1 by, e.g., receiving code blocks in the unit of a sub-frame.

Referring to FIG. 5, the UE 10 may receive the first data DATA1 by receiving the $0^{th}$ code block through the $7^{th}$ code block in eight sub-frames.

In operation S21, the UE 10 may receive the third code block, and determine based on a CRC code (which is included in each code block) whether the received third code block has an error.

In operation S31, when the UE 10 determines that the third code block has an error, the UE 10 may transmit the NACK signal to the BS 20 to request retransmission of the third code block. A time when the BS 20 receives the NACK or ACK signal corresponding to each code block included in the first data DATA1 after transmitting the code block to the UE 10 may be referred to as a data round trip time (RTT). The third code block of the first data DATA1 may be at least temporarily stored in a buffer of the UE 10.

In operation S41, the BS 20, having received the NACK signal, may transmit a third code block of second data DATA2 to the UE 10. The second data DATA2 may include a $0^{th}$ code block through a $7^{th}$ code block corresponding to the first data DATA1, and the third code block of the second data DATA2 may include the same code as that of the third code block of the first data DATA1.

In operation S51, the UE 10 may determine whether the third code block of the received second data DATA2 has an error.

In operation S61, the UE 10 may generate combined data based on the third code block of the received second data DATA2 and the third code block of the first data DATA1 stored in the buffer, thereby generating errorless data.

Figure 6:
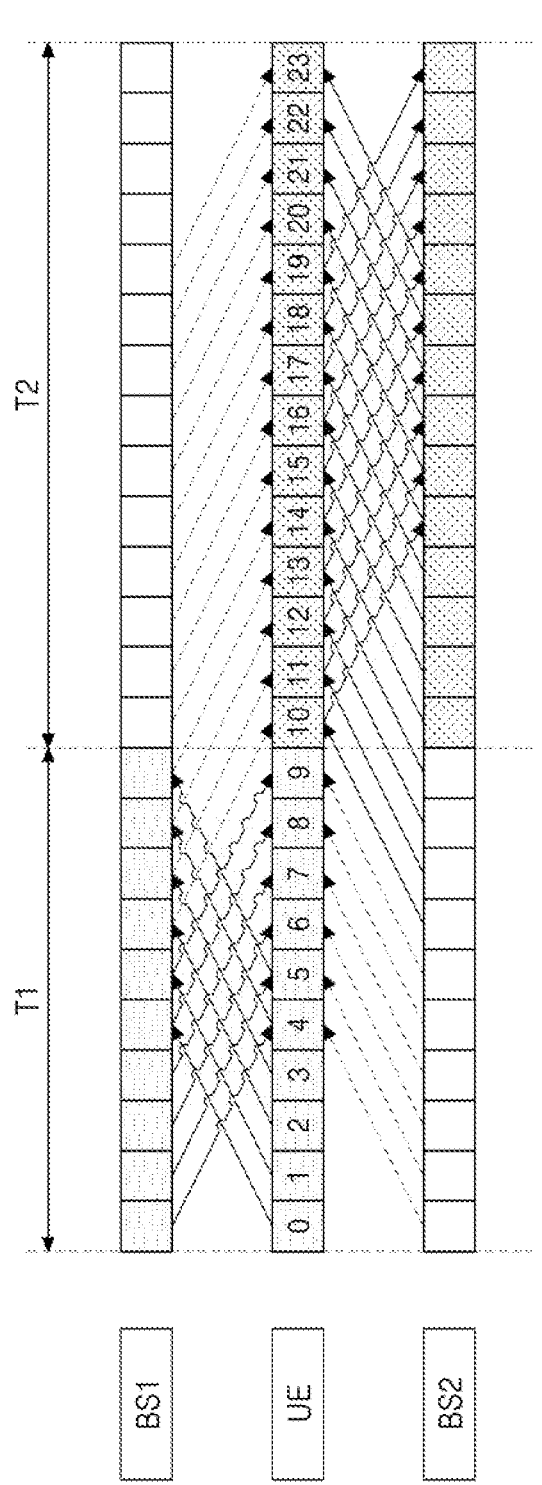
FIG. 6 illustrates a method of performing a HARQ process with a plurality of BSs, according to a comparative example.

FIG. 6 illustrates a method of performing a HARQ process with a plurality of BSs, according to a comparative example.

Referring to FIG. 6, when a UE according to the comparative example receives data from a plurality of BSs, the UE may receive data from each BS by sharing one RF resource and performing time division. The UE may transmit a response signal to the received data to each BS. For example, in a first time duration T1, the UE may receive data from a first BS BS1. The UE may transmit any one of the ACK signal and the NACK signal to the first BS based on error detection with respect to the received data. The UE transmitting and receiving communication data based on a first SIM may activate connection between a second SIM and a transceiver by performing RF switching in the first time duration T1, thereby transmitting and receiving communication data to and from a second BS BS2 based on the second SIM in a second time duration T2.

In contrast, according to an example embodiment, when the UE performs wireless communication through an RAN of LTE, four sub-frames may be consumed to receive a code block from each BS and perform error detection on the code block. In this case, one sub-frame may correspond to 1 ms, and the UE may transmit and receive one code block in one sub-frame. The UE having performed error detection may transmit, to each BS, any one of the ACK signal and the NACK signal with respect to the received code block according to whether an error is detected. In this case, four sub-frames may be consumed for each BS to receive the ACK signal and the NACK signal and transmit a subsequent code block. Thus, eight sub-frames may be consumed until the UE receives a code block and receives a subsequent code block corresponding to the received code block. The eight sub-frames may be referred to as a data RTT in an LTE RAN.

For example, when the UE receives data in a $4^{th}$ sub-frame, the UE may perform the HARQ process until an $8^{th}$ sub-frame and transmit the ACK signal or the NACK signal to the first BS in the $8^{th}$ sub-frame, and the first BS may transmit a subsequent code block regarding the data transmitted in the $4^{th}$ sub-frame to the UE in a $12^{th}$ sub-frame.

Referring again to FIG. 6, in the comparative example, the UE may perform wireless communication with the first BS in the first time duration T1 corresponding to the $0^{th}$ through $9^{th}$ sub-frames, and perform wireless communication with the second BS in the second time duration T2 corresponding to $10^{th}$ through $23^{rd}$ sub-frames. In this case, the first BS may transmit data to the UE in the $2^{nd}$ through $9^{th}$ subframes in the first time duration T1, and receive the ACK signal or the NACK signal with respect to the transmitted data in the $6^{th}$ through $13^{th}$ sub-frames. The first BS may generate subsequent code blocks in response to the received ACK or NACK signal, and transmit the subsequent code blocks to the UE in the $10^{th}$ through $17^{th}$ sub-frames.

However, the UE has allocated the $10^{th}$ through $23^{rd}$ sub-frames to wireless communication based on the second BS, and thus may not be able to receive the subsequent code blocks transmitted to the first BS or to perform wireless communication through the second BS.

Hereinbelow, an example embodiment will be described in which the UE 10 sets a SIM allocation duration corresponding to each BS based on a data RTT, to minimize data latency and efficiently communicate with the plurality of BSs 21 and 22.

Figure 7:
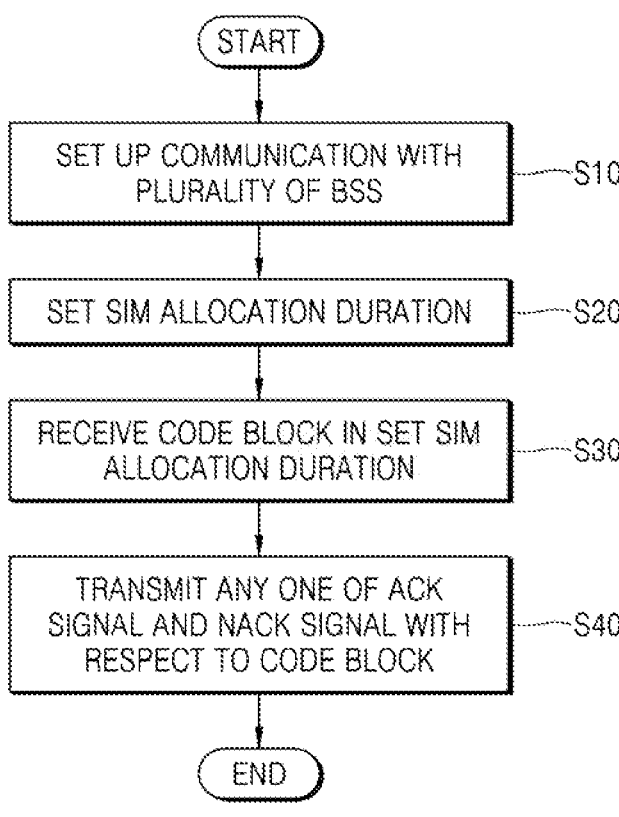
FIG. 7 is a flowchart of an operating method of a UE according to an example embodiment.

FIG. 7 is a flowchart of an operating method of the UE 10 according to an example embodiment.

Referring to FIG. 7, when the UE 10 sets up communication with a plurality of BSs, the UE 10 may perform communication without latency corresponding to RF switching by transmitting and receiving data in a SIM allocation duration that is set for each BS. In operation S10, when the UE 10 receives a communication request from a plurality of SIMs, the UE 10 may set up communication with a BS corresponding to each SIM.

In operation S20, the UE 10 may set SIM allocation durations respectively corresponding to the plurality of BSs for one multi-SIM allocation period, in which each SIM allocation duration may correspond to a different sub-frame in the multi-SIM allocation period. The multi-SIM allocation period may be a time until the UE 10 receives a code block and receives a subsequent code block with respect to the received code block, and may correspond to a data RTT.

In operation S30, the UE 10 may receive a code block from each BS in the set SIM allocation duration and perform the HARQ process on the received code block. The HARQ process may include a series of processes of detecting whether the received code block has an error based on a CRC code included in the received code block and storing the received code block in a buffer.

In operation S40, the UE 10 may transmit, to each BS, any one of the ACK signal and the NACK signal with respect to the received code block. When the UE 10 determines that the error is detected from the code block, the UE 10 may transmit the NACK signal to the BS to request retransmission; however, when the UE 10 determines that the error is not detected from the code block, the UE 10 may transmit the ACK signal to the BS.

The UE 10 may perform communication with the plurality of BSs without latency, by transmitting a code block in a set SIM allocation duration for each of a plurality of multi-SIM allocation periods.

Figure 8:
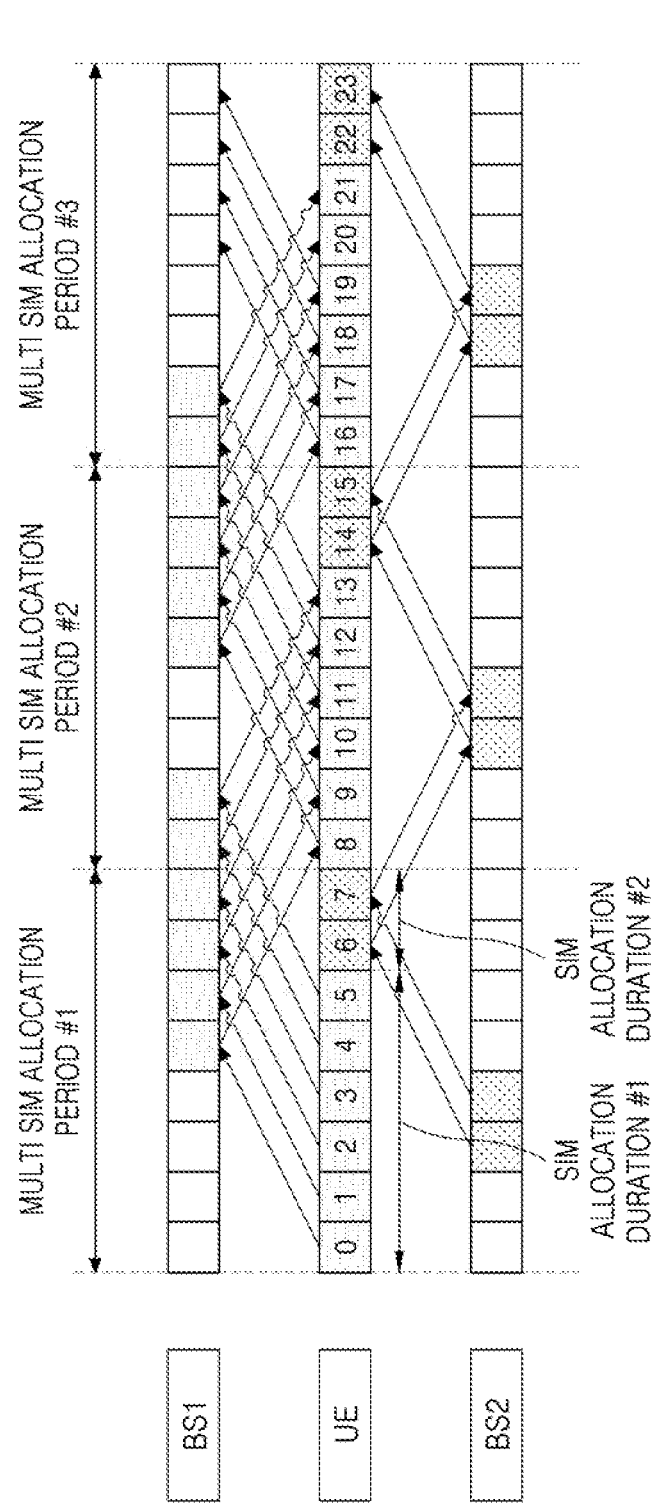
FIG. 8 illustrates a method of performing a HARQ process with a plurality of BSs, according to an example embodiment.

FIG. 8 illustrates a method of performing a HARQ process with a plurality of BSs, according to an example embodiment.

Referring to FIG. 8, the UE 10 may perform first wireless communication and second wireless communication through the first BS 21 and the second BS 22.

The UE 10 may set a first SIM allocation duration (SIM allocation duration #1) for first wireless communication and a second SIM allocation duration (SIM allocation duration #2) for second wireless communication in one multi-SIM allocation period. The multi-SIM allocation period may be a minimum time period required to allocate a plurality of SIMS to an RF resource. According to the present example embodiment, the length of the multi-SIM allocation period may correspond to the length of the data RTT. According to the example embodiment of FIG. 8, each of a first multi-SIM allocation period (multi SIM allocation period #1), a second multi-SIM allocation period (multi SIM allocation period #2), and a third multi-SIM allocation period (multi SIM allocation period #3) may be set as a time period corresponding to a data RTT between the UE 10 and each BS.

The start and end of a multi-SIM allocation period may be determined based on any one of received data and transmission data. For example, when the UE 10 receives a target code block, a time until reception of a subsequent code block corresponding to the target code block may be determined as one multi-SIM allocation period; when the UE 10 transmits any one of the ACK signal and the NACK signal with respect to the target code block to the BS, a time until transmission of any one of the ACK signal and the NACK signal with respect to the subsequent code block to the BS may be determined as one multi-SIM allocation period. Thus, according to the present example embodiment, the UE may perform wireless communication corresponding to a plurality of SIMs until reception of corresponding subsequent data, by performing the HARQ process based on received data.

Before the first multi-SIM allocation period, the UE 10 may set a part of the multi-SIM allocation period as the first SIM allocation duration and another part as the second SIM allocation duration. For example, referring to FIG. 8, the UE 10 may set the $0^{th}$ through $5^{th}$ sub-frames as the first SIM allocation duration for performing the HARQ process in first wireless communication, and the $6^{th}$ and $7^{th}$ sub-frames as the second SIM allocation duration for performing the HARQ process in second wireless communication.

In the first multi-SIM allocation period, the UE 10 may transmit any one of the ACK signal and the NACK signal to the first BS 21 in each sub-frame included in the first SIM allocation duration. The first BS 21 may transmit a subsequent code block in each sub-frame in response to any one of the ACK signal and the NACK signal received from the UE 10. For example, the first BS 21 may receive code blocks corresponding to $0^{th}$ through $5^{th}$ subframes from the UE 10 and transmit the subsequent code block to the UE 10 in the $4^{th}$ through $9^{th}$ sub-frames after four sub-frames receiving code blocks from the UE 10.

In the second multi-SIM allocation period, the UE 10 may receive a subsequent code block from the first BS 21, perform the HARQ process, and transmit any one of the ACK signal and the NACK signal to the first BS 21 based on a result of the HARQ process. Referring to FIG. 8, in the $8^{th}$ through $13^{th}$ sub-frames, the UE 10 may perform the HARQ process. Thus, in the first multi-SIM allocation period, the $6^{th}$ and $7^{th}$ sub-frames may be set as available sub-frames in which other wireless communication, instead of first wireless communication, may be performed.

Thus, the UE 10 may perform second wireless communication with the second BS 22 without latency, by setting the available sub-frames as the second SIM allocation duration, unlike in the comparative example of FIG. 6. For example, referring to FIG. 8, the UE 10 may perform the HARQ process for second wireless communication in the $6^{th}$ and $7^{th}$ sub-frames of the first multi-SIM allocation period.

In the example embodiment described in connection with FIG. 8, the UE 10 communicates with the first BS 21 and the second BS 22, but the UE 10 may communicate with, e.g., three or more BSs, and the number of sub-frames constituting a multi-SIM allocation period may be a number other than 8. Also, in the example embodiment described in connection with FIG. 8, the multi-SIM allocation period and each SIM allocation duration are set based on a sub-frame in which the UE 10 receives data, but the multi-SIM allocation period and each SIM allocation duration may also be set based on, e.g., a sub-frame in which the UE 10 transmits a signal. For example, the first SIM allocation durations of the $0^{th}$ through $5^{th}$ sub-frames, the $8^{th}$ through $13^{th}$ sub-frames, and the $16^{th}$ through $21^{st}$ sub-frames may be time durations allocated to a reception module to receive data from the first BS 21, but may also be time durations allocated to a transmission module to transmit the ACK signal or the NACK signal with respect to the data received from the first BS 21.

As described above, according to an example embodiment, the UE 10 may perform wireless communication without latency, by separately controlling SIM allocation durations allocated to the transmission module and the reception module.

FIG. 9 illustrates data generated in the first BS 21 according to the example embodiment of FIG. 8, and FIG. 10 illustrates data generated in the second BS 22.

Referring to FIG. 9, the first BS 21 may transmit a transport block (TB) (for transmitting information requested by the UE 10) to a PHY layer, and generate data in which a CRC code (which is an error detection block) is added to the TB. The first BS 21 may divide data into a plurality of code blocks CB0 through CB5, the number of which may correspond to the number of sub-frames of a SIM allocation duration that is set in the UE 10. According to the example embodiment of FIG. 8, when the first SIM allocation duration includes 6 sub-frames, the first BS 21 may divide data into six code blocks CB0 through CB5, and sequentially provide them to the UE 10 in the respective sub-frames.

A CRC code may be added to each of the code blocks CB0 through CB5, and the UE 10 may determine, based on the CRC code, whether a received code block has an error for each sub-frame.

HARQ process IDs ID0 through ID5 (corresponding to the respective code blocks CB0 through CB5) may be generated and may be provided, together with the code blocks CB0 through CB5, to the UE 10. The HARQ process ID may correspond to a sub-frame order of a multi-SIM allocation period and may be referred to as a redundancy version (RV).

The first BS 21 may transmit code blocks and the HARQ process IDs ID0 through ID5 to the UE 10 through different channels in a downlink. For example, the first BS 21 may provide the HARQ process IDs ID0 through ID5 to the UE 10 through a PDCCH and the code blocks CB0 through CB5 to the UE 10 through a PDSCH.

Referring to FIG. 10, the second BS 22, like the first BS 21, may divide data (which has a CRC code added to a TB) by the number of sub-frames included in the second SIM allocation duration, thus providing the code blocks CB0 and CB1 to the UE 10.

The second BS 22 may provide HARQ process IDs IDG and IDT corresponding to sub-frame orders, together with the code blocks (CB0 and CB1), to the UE 10.

Thus, referring to FIGS. 8 through 10, when the first SIM allocation duration includes the 0th through 5th sub-frames, the UE 10 may receive the 0th HARQ process ID ID0 through the 5th HARQ process ID ID5 corresponding to the code blocks (CB0 through CB5) from the first BS 21. When the second SIM allocation duration includes the 6th and 7th sub-frames, the UE 10 may receive a 6th HARQ process ID ID6 and a 7th HARQ process ID ID7 corresponding to the code blocks CB0 and CB1 from the second BS 22.

Figure 11:
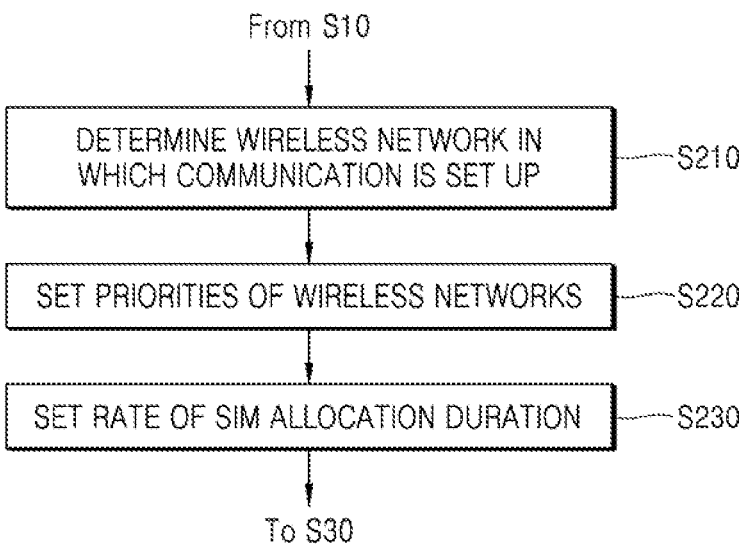
FIG. 11 is a flowchart of a method of setting a SIM allocation duration, according to an example embodiment.

FIG. 11 is a flowchart of a method of setting a SIM allocation duration, according to an example embodiment.

Referring to FIG. 11, the UE 10 may adaptively set a SIM allocation duration by adjusting a rate of a SIM allocation duration with respect to a multi-SIM allocation period. In operation S210, the UE 10 may determine the number of wireless networks for communication set up between a plurality of SIMs and BSs. A communication processor may determine a communication quality of each wireless network, a type of a service executed in each wireless network, etc.

In operation S220, the UE 10 may set priorities of the wireless networks in which communication is set up. The priorities may be determined according to a capacity of data to be transmitted and received through each wireless network, or a type of a service to be executed in each wireless network. The UE 10 may determine the priorities based on the capacity of the data to be transmitted and received, for example. In another example, the UE 10 may determine the priorities in response to an allocation request from each BS.

In operation S230, the UE 10 may adjust a rate of a SIM allocation duration with respect to a multi-SIM allocation period, based on the set priorities. For example, when the UE 10 forms a plurality of wireless networks through the first BS 21 and the second BS 22, when the capacity of the data transmitted and received through the second BS 22 increases, or when the service to be executed through the second BS 22 calls for a higher speed, then a rate of the second SIM allocation duration may be increased.

Figure 12:
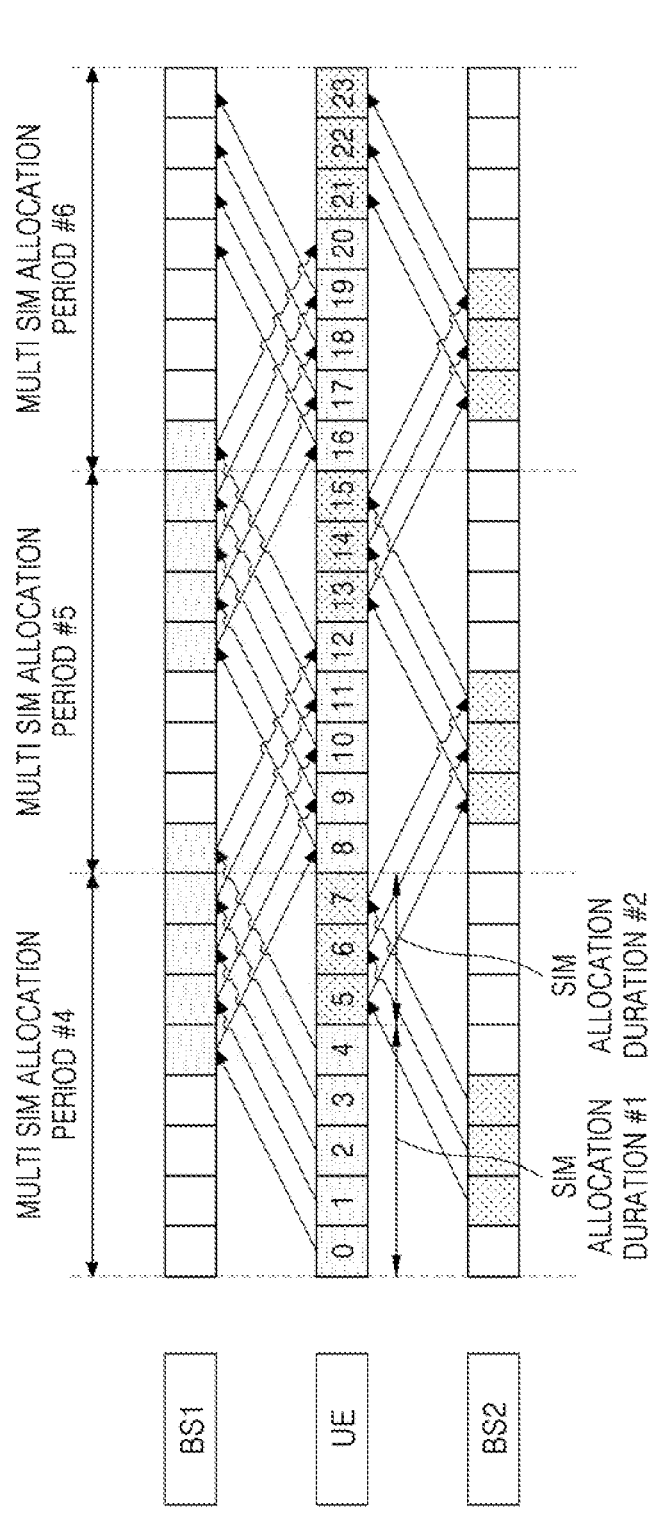
FIG. 12 illustrates a method of performing a HARQ process with a plurality of BSs, according to an example embodiment.

FIG. 12 illustrates a method of performing a HARQ process with a plurality of BSs, according to an example embodiment.

Referring to FIG. 12, the UE 10 may perform wireless communication through a plurality of networks by resetting a SIM allocation duration corresponding to each BS in a multi-SIM allocation period. After the third multi-SIM allocation period (multi SIM allocation period #3) of FIG. 8, the UE 10 may reset the priorities of the wireless networks and reset SIM allocation durations based on the reset priorities.

For example, when the amount of data transmitted and received by the second SIM increases, the communication processor may reset the SIM allocation durations by allocating more sub-frames to the second SIM. Thus, in the example embodiment of FIG. 12, the UE 10 may perform first wireless communication in 5 sub-frames among 8 sub-frames, and perform second wireless communication in the other 3 sub-frames.

Figure 13:
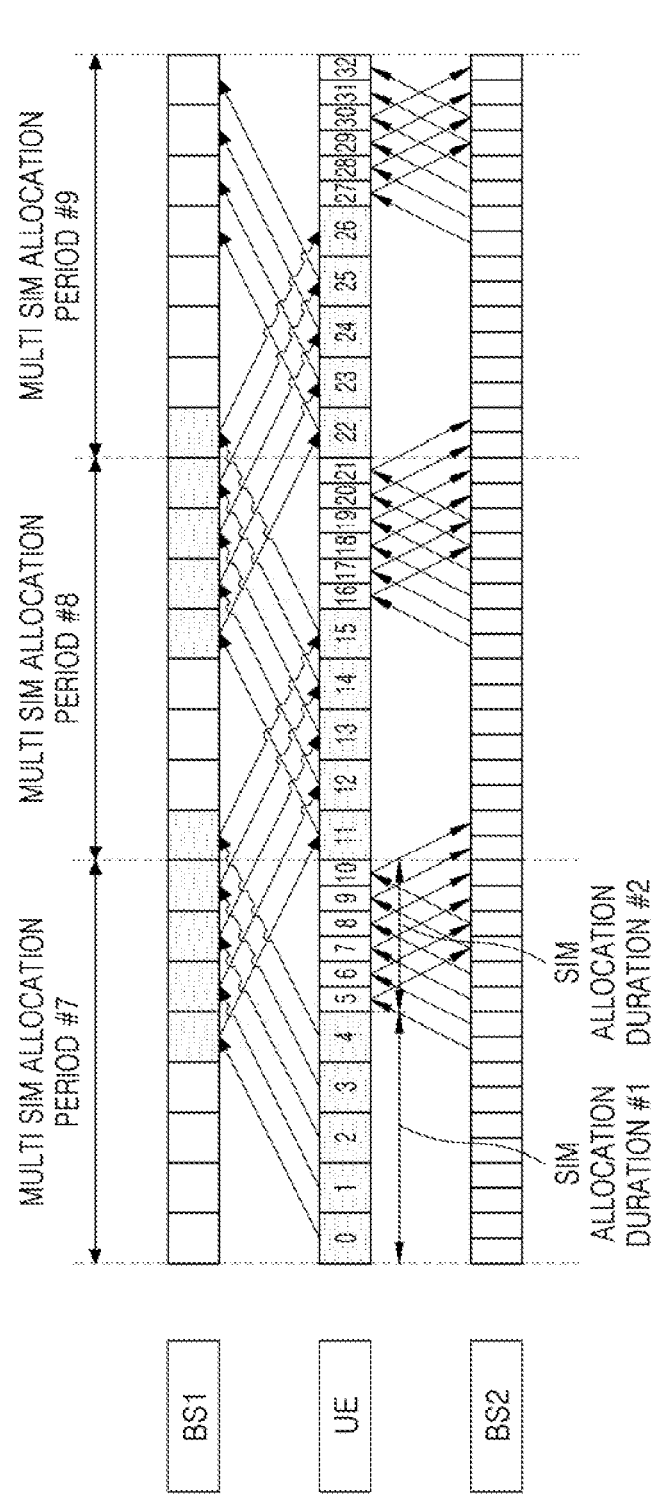
FIG. 13 illustrates a method of performing a HARQ process with a plurality of BSs operating based on another radio access technology (RAT), according to an example embodiment.

FIG. 13 illustrates a method of performing a HARQ process with a plurality of BSs operating based on another RAT, according to an example embodiment.

Referring to FIGS. 2 and 13, the first BS 21 and the first SIM 11_1 of the UE 10 may communicate with each other based on a first RAT, and the second BS 22 and the second SIM 11_2 of the UE 10 may communicate with each other based on a second RAT that is different from the first RAT. For example, the first RAT may be LTE or LTE-A, and the second RAT may be 5G NR. Thus, the HARQ process based on the second BS 22 and the second SIM may be performed faster than the HARQ process based on the first BS 21 and the first SIM. Moreover, a sub-frame time unit of the second RAT may be shorter than a sub-frame time unit of the first RAT.

The UE 10 may set a multi-SIM allocation period based on a data RTT of an RAT having a longer RTT between the first RAT and the second RAT. For example, when the first RAT, which is LTE, has a data RTT of 8 ms corresponding to the HARQ process and the second RAT, which is 5G NR, has a data RTT of 2 ms corresponding to the HARQ process, then the UE 10 may set a multi-SIM allocation period to 8 ms.

For the set multi-SIM allocation period, the UE 10 may set a SIM allocation duration corresponding to each BS and each SIM, and each BS and the UE 10 may transmit and receive data by performing the HARQ process in the set SIM allocation duration. For example, the UE 10 may transmit a response signal to the first BS 21 by performing the HARQ process with respect to data received in the $0^{th}$ through $4^{th}$ sub-frames. The UE 10 may transmit and receive data to and from the second BS 22 in a sub-frame having a shorter time duration than that of a sub-frame allocated in the first RAT. Referring to FIG. 13, the UE 10 may transmit a response signal to the second BS 22 by performing the HARQ process with respect to data received from the second BS 22 in the $5^{th}$ through $10^{th}$ sub-frames.

Figure 14:
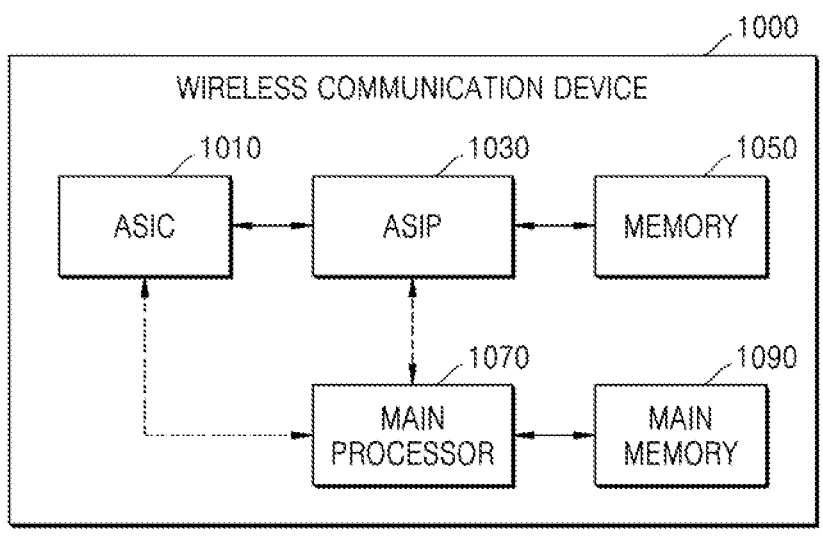
FIG. 14 is a block diagram schematically showing components of a wireless communication device, according to an example embodiment.

FIG. 14 is a block diagram schematically showing components of a wireless communication device, according to an example embodiment.

Referring to FIG. 14, a wireless communication device 1000 may include an application specific integrated circuit (ASIC) 1010, an application specific instruction set processor (ASIP) 1030, a memory 1050, a main processor 1070, and a main memory 1090. Two or more of the ASIC 1010, the ASIP 1030, and the main processor 1070 may communicate mutually. Two or more of the ASIC 1010, the ASIP 1030, the memory 1050, the main processor 1070, or the main memory 1090 may be embedded in one chip.

The ASIP 1030, which is an integrated circuit customized for a specific purpose, may support an instruction set dedicated to a particular application and execute an instruction in the instruction set.

The memory 1050 may communicate with the ASIP 1030. The memory 1050 may be a non-transitory storage device, and may store a plurality of instructions executed by the ASIP 1030. For example, the memory 1050 may include random-type memory accessible by the ASIP 1030, such as random-access memory (RAM), read only memory (ROM), tape, a magnetic disk, an optical disk, a volatile memory, a non-volatile memory, and a combination thereof.

The main processor 1070 may control the wireless communication device 1000 by executing a plurality of instructions. For example, the main processor 1070 may control the ASIC 1010 and the ASIP 1030, process data received through a wireless communication network, or process a user input with respect to the wireless communication device 1000.

The main memory 1090 may communicate with the main processor 1070. The main memory 1090 may be a non-transitory storage device, and may store a plurality of instructions executed by the main processor 1070. For example, the main memory 1090 may include random-type memory accessible by the main processor 1070, such as RAM, ROM, tape, a magnetic disk, an optical disk, a volatile memory, a non-volatile memory, and a combination thereof.

A wireless communication method according to an example embodiment described above may be performed by at least one of components included in the wireless communication device 1000 of FIG. 14. In an example embodiment, at least one operation of the wireless communication method and the communication processor 100 of FIG. 2 may be implemented as a plurality of instructions stored in the memory 1050. The ASIP 1030 may perform at least one of the operations of the wireless communication method and at least some of operations of the communication processor 100 of FIG. 2, by executing the plurality of instructions stored in the memory 1050. In an example embodiment, at least one of the operations of the wireless communication method and the communication processor 100 of FIG. 2 may be implemented as a hardware block designed by logic synthesis, etc., and may be included in the ASIC 1010. In an example embodiment, at least one of the operations of the wireless communication method and the communication processor 100 of FIG. 2 may be implemented as a plurality of instructions stored in the main memory 1090, and the main processor 1070 may perform at least one of the operations of the wireless communication method and at least some of the operations of the communication processor 100 of FIG. 2, by executing the plurality of instructions stored in the main memory 1090.

By way of summation and review, when a general wireless communication terminal operates based on the FEC process, the wireless communication terminal may correct an error through an error correction code; however, when the wireless communication terminal operates based on the ARQ process, the wireless communication terminal may correct an error by requesting data retransmission. Hybrid automatic repeat request (HARQ) is a transmission scheme that improves a time delay of an upper layer by adding channel coding for using an error packet to an existing automatic repeat request (ARQ). HARQ may be used in various mobile communication standards such as high-speed packet access (HSPA), long term evolution (LTE), etc.

As described above, embodiments may provide a method of minimizing latency and efficiently performing a hybrid automatic repeat request (HARQ) process in wireless communication based on a plurality of subscriber identity modules (SIMs).

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of operating a wireless communication terminal that performs a hybrid automatic repeat request (HARQ) process for a plurality of subscriber identity modules (SIMs), the method comprising:

setting up communication with a plurality of base stations that respectively correspond to the plurality of SIMs;

allocating a radio frequency resource of the wireless communication terminal to receive data from each base station corresponding to each respective SIM during a SIM allocation duration for each base station, wherein for each base station, the SIM allocation duration is set to correspond to the respective SIM corresponding to that base station and is part of a multi-SIM allocation period, and wherein the multi-SIM allocation period has a length the same as a sum of the SIM allocation durations for the plurality of base stations corresponding to the plurality of SIMs, which length equals a data round trip time (RTT) between the wireless communication terminal and a base station of the plurality of base stations; and transmitting, with respect to the received data, one of an acknowledged (ACK) signal and a negative-ACK (NACK) signal to each base station corresponding to each respective SIM.

2. The method as claimed in claim 1, wherein:

the multi-SIM allocation period includes a plurality of sub-frames, and the SIM allocation duration includes at least one sub-frame included in the plurality of sub-frames.

3. The method as claimed in claim 2, wherein:

the receiving of the data includes receiving data from a base station allocated to the SIM allocation duration in at least one sub-frame included in the SIM allocation duration, and the transmitting of the one of the ACK signal and the NACK signal includes transmitting one of the ACK signal and the NACK signal to the base station corresponding to the SIM, in response to the data received in the at least one sub-frame included in the SIM allocation duration.

4. The method as claimed in claim 1, wherein the receiving of the data includes setting a SIM allocation duration for each of the plurality of base stations.

5. The method as claimed in claim 4, wherein:

the plurality of SIMs include a first SIM and a second SIM, the plurality of base stations include a first base station corresponding to the first SIM and a second base station corresponding to the second SIM, and the setting of the SIM allocation duration includes:

setting a part of the multi-SIM allocation period as a first SIM allocation duration corresponding to the first base station, when the wireless communication terminal communicates with the first base station based on the first SIM; and setting another part of the multi-SIM allocation period as a second SIM allocation duration corresponding to the second base station, when the wireless communication terminal communicates with the second base station based on the second SIM.

6. The method as claimed in claim 5, further comprising setting the multi-SIM allocation period based on a data RTT of a base station having a longer data RTT between the first base station and the second base station, when the first base station and the second base station operate with different radio access technologies.

7. The method as claimed in claim 4, wherein the setting of the SIM allocation duration includes adjusting a rate of the SIM allocation duration corresponding to each of the plurality of base stations with respect to the multi-SIM allocation period, based on a rate of amounts of the data received from each of the plurality of base stations.

8. The method as claimed in claim 4, wherein the setting of the SIM allocation duration includes adjusting the SIM allocation duration respectively corresponding to each of the plurality of base stations with respect to the multi-SIM allocation period, based on a priority associated with the data received from each of the plurality of base stations.

9. The method as claimed in claim 4, wherein the setting of the SIM allocation duration includes transmitting a setting result to the plurality of base stations.

10. The method as claimed in claim 4, wherein the setting of the SIM allocation duration includes setting the SIM allocation duration based on a sub-frame allocation request received from each of the plurality of base stations.

11. The method as claimed in claim 1, wherein the receiving of the data includes performing radio frequency switching to communicate with a base station corresponding to a shifted SIM allocation duration, when the SIM allocation duration is shifted.

12. The method as claimed in claim 1, wherein the receiving of the data includes receiving data resulting from dividing medium access control data, which includes a transport block and an error detection code, by a sub-frame unit allocated to a base station.

13. The method as claimed in claim 12, wherein the receiving of the data resulting from the dividing includes receiving HARQ process identification corresponding to the data resulting from the dividing.

14. The method as claimed in claim 1, wherein the transmitting of the one of the ACK signal and the NACK signal includes at least temporarily storing data corresponding to a sub-frame in which the NACK signal is transmitted.

15. The method as claimed in claim 1, further comprising:

when transmitting the NACK signal with respect to the received data, re-receiving data from a base station that received the NACK signal; and generating combined data based on the re-received data.

16. A wireless communication terminal that performs a hybrid automatic repeat request (HARQ) process for a plurality of subscriber identity modules (SIMs), the wireless communication terminal comprising:

a HARQ processor configured to set a SIM allocation duration for each of the plurality of SIMs in a multi-SIM allocation period, wherein the multi-SIM allocation period has a length the same as a sum of the SIM allocation durations for the plurality of SIMs, and wherein the multi-SIM allocation period equals a data round trip time between the wireless communication terminal and a base station among a plurality of base stations within a communication range of the wireless communication terminal, and configured to allocate a radio frequency resource to communicate with the plurality of base stations, wherein each base station of the plurality of base stations corresponds to a respective SIM of the plurality of SIMs;

a reception module configured to receive data, for each SIM during the SIM allocation duration for that SIM, from a respective base station for which communication is set up for that SIM; and a transmission module configured to transmit one of an acknowledged signal and a negative-acknowledged signal with respect to the received data.

17. The wireless communication terminal as claimed in claim 16, wherein the HARQ processor is further configured to adjust a rate of a SIM allocation duration corresponding to each base station based on a rate of amounts of the data received from each of the plurality of base stations.

18. The wireless communication terminal as claimed in claim 16, wherein the HARQ processor is further configured to adjust a rate of a SIM allocation duration corresponding to each base station based on a priority of data received from each of the plurality of base stations.

19. A method of operating a wireless communication terminal that performs a hybrid automatic repeat request process for a plurality of subscriber identity modules (SIMs), the method comprising:

setting up communication with a first base station corresponding to a first SIM of the plurality of SIMs;

setting up communication with a second base station corresponding to a second SIM of the plurality of SIMs;

receiving data from the first base station in a first SIM allocation duration, which is allocated corresponding to the first base station, in a multi-SIM allocation period that equals a data round trip time between the wireless communication terminal and one of the first base station and the second base station so that the multi-SIM allocation period equals the longer of (a) a data round trip time between the wireless communication terminal and the first base station, and (b) a data round trip time between the wireless communication terminal and the second base station;

transmitting, to the first base station, one of an acknowledged signal and a negative-acknowledged signal with respect to the received data from the first base station;

receiving data from the second base station allocated in a second SIM allocation duration, which is different from the first SIM allocation duration and is allocated corresponding to the second base station, in the multi-SIM allocation period; and transmitting, to the second base station, one of the acknowledged signal and the negative-acknowledged signal with respect to the received data from the second base station.

20. The method as claimed in claim 19, further comprising adjusting a rate of the first SIM allocation duration and a rate of the second SIM allocation duration based on one or more of:

rates of amounts of the data received from the first base station and the second base station, or priorities associated with the data received from the first base station and the second base station.

* * * * *